J. ENNIS, dec'd,
J. A. FRAZER & R. A. ENNIS, administrators, S. A. EATON, assignee.
Wheelbarrow.
No. 9,395. Reissued Oct. 5, 1880.
Fig. 1.
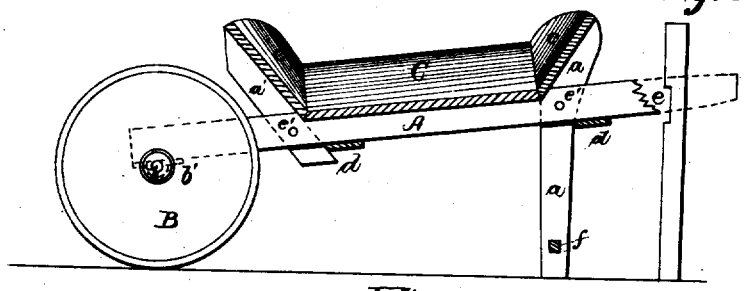
Fig. 3
Fig. 2.
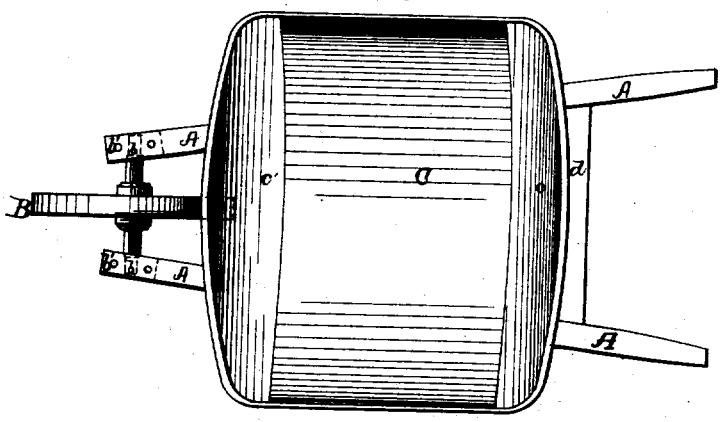
Fig. 4.
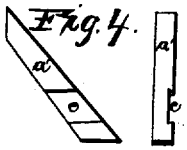
WITNESSES
C. Aubrey Faulkner
J. J. McCarthy
By Stephen A. Eaton assignee
Attorney S. Alexander Thaxton
N. PETERS, PHOTO-LITHOGRAPHER, WASHINGTON, D. C.

UNITED STATES PATENT OFFICE.

STEPHEN A. EATON, OF HUDSON, MICHIGAN, ASSIGNEE OF J. A. FRAZER AND R. A. ENNIS, ADMINISTRATORS OF JAMES ENNIS, DECEASED.

WHEELBARROW.

SPECIFICATION forming part of Reissued Letters Patent No. 9,395, dated October 5, 1880.

Original No. 108,341, dated October 18, 1870. Application for reissue filed September 25, 1878.

*To all whom it may concern:*

Be it known that JAMES ENNIS, of Columbus, in the county of Muscogee and State of Georgia, did invent certain new and useful Improvements in Wheelbarrows, of which the following is a specification.

The object of the invention is to simplify, strengthen, and cheapen the construction of railroad-wheelbarrows; and it consists in the construction of the braces and legs that give the shape and support the front and back boards of the barrow-box, and at the same time support the hand-bearers at their back or hand ends, as will be hereinafter more fully set forth.

In the drawings, Figure 1 is an upright sectional view of the barrow and its parts. Fig. 2 is a plan or top view. Fig. 3 is an edge view of the supporting-leg, and Fig. 4 is a side and edge view of the forward braces that support the forward board of the barrow-box.

Heretofore barrows have been made having the supporting-legs and braces or cleats that hold the forward and back board of the box attached to the hand-bearers by means of a mortise in the hand-bearer and a tenon on the brace, thus tending to weaken the main parts of the barrow; but by this method of constructing the frame of the barrow this liability to weaken the hand-bearer is entirely obviated, as none of the wood of that part is cut away that in any way weakens it.

A A are the common hand-bearers, and are supported in the usual way at their forward ends by means of the journal-boxes *b' b'*, bearing upon axle-bearings *b b* of wheel B. C is the usual bent bottom. *c* is the back, and *c'* is the front, board of the box of the barrow, the three pieces completing the box. *d d* are the lateral girts that hold the two hand-bearers in horizontal position. *a a* are the two legs that support the hand-bearers back of the wheel and form the braces that support the back board of the box. *a' a'* are the forward braces, that support the forward board of the box; or the legs and braces may be bent to form the angle and hold the box.

The legs *a a* and braces *a' a'* are notched, or a portion cut out of one side to fit upon the side of the hand-bearer, and at the proper angle, as seen in Figs. 3 and 4, and when put in place upon hand-bearers A A are secured thereto by means of screw-bolts *e' e'*; or wood-screws of sufficient strength may be used instead of the screw-bolts.

*f* is a brace between the legs *a a*, and prevents any lateral strain from injuring them.

By this construction of the legs and braces none of the wood of the hand-bearers is cut away, and their full strength remains, as nothing is cut by mortising to weaken the hand-bearer, as only a small bolt-hole, which is filled with a closely-fitting screw-bolt, is made in the hand-bearer; but the strain of the legs and braces is put upon the shoulders of the notches that bear upon the top and under sides of the hand-bearers. Hence the braces extend below as well as above the hand-bearers.

The back braces are a part of the supporting-legs, as a single plank forms the leg and brace.

This barrow is cheap, made of few parts, is strong and not liable to get out of order, and can be, when out of order, easily repaired.

Having thus fully described this invention, what is claimed as new, and desired to be secured by Letters Patent, is—

1. The combination, with a barrow-tray having a rearwardly-inclined end and hand-bearers, of legs provided with grooves in which the hand-bearers fit, said legs being formed with upper extremities, against which said tray end bears and is thereby supported, substantially as and for the purpose described.

2. The combination, with a barrow-tray having a forwardly-inclined end and hand-bearers, of braces against which said tray end bears and is thereby supported, said braces having their lower extremities provided with grooves in which the hand-bearers fit, substantially as and for the purpose described.

3. The combination, with a barrow-tray having oppositely-inclined front and rear ends and hand-bearers, of legs whose upper extremities support the rear tray end and braces which support the front tray end, the sides of said legs and braces being provided with grooves in which the hand-bearers respectively fit, substantially as and for the purpose described.

In testimony that the foregoing is the invention of JAMES ENNIS, deceased, I have hereunto set my hand this 29th day of August, 1878.

Witnesses: STEPHEN A. EATON.

C. M. ALEXANDER,

J. M. MASON.